United States Patent [19]

Wooh

[11] 4,043,920

[45] Aug. 23, 1977

[54] SKIMMER FOR SQUARE SETTLING TANKS

[75] Inventor: Thomas Wooh, Wilton, Conn.

[73] Assignee: Dorr-Oliver Incorporated, Stamford, Conn.

[21] Appl. No.: 717,637

[22] Filed: Aug. 25, 1976

[51] Int. Cl.² ............................................. B01D 21/18
[52] U.S. Cl. ..................................... 210/525; 210/529
[58] Field of Search .............. 210/523, 525, 528, 529, 210/530

[56] References Cited

U.S. PATENT DOCUMENTS

| 1,457,794 | 6/1923 | Piper | 210/529 |
| 2,238,024 | 4/1941 | Linch | 210/529 X |
| 2,261,487 | 11/1941 | Scott et al. | 210/529 |
| 2,863,564 | 12/1958 | Lind et al. | 210/529 |
| 3,465,887 | 9/1969 | Cookney | 210/525 |
| 3,770,132 | 11/1973 | Quest et al. | 210/525 |

Primary Examiner—Theodore A. Granger

Attorney, Agent, or Firm—Theodore M. Jablon; Burtsell J. Kearns

[57] ABSTRACT

In a continuously operating square settling tank, the provision of scum skimming devices wherein a pivotally mounted corner exploring skimmer member is swingable in a predetermined horizontal plane, while kept in contact with the peripheral scum baffle during rotation of the supporting rake structure. This skimmer member forms with the scum baffle a scum collecting pocket whereby when the thus collected scum is pushed up along the slope of a ramp, it is trapped and thereby contained on the ramp for delivery into a receiving box connected to the ramp.

The scum collecting effectiveness of the skimmer member may be enhanced by the additional provision of a directional skimmer blade cooperatively so related to the swingable skimmer member, that floating scum material is thereby guided into said collecting pocket.

13 Claims, 12 Drawing Figures

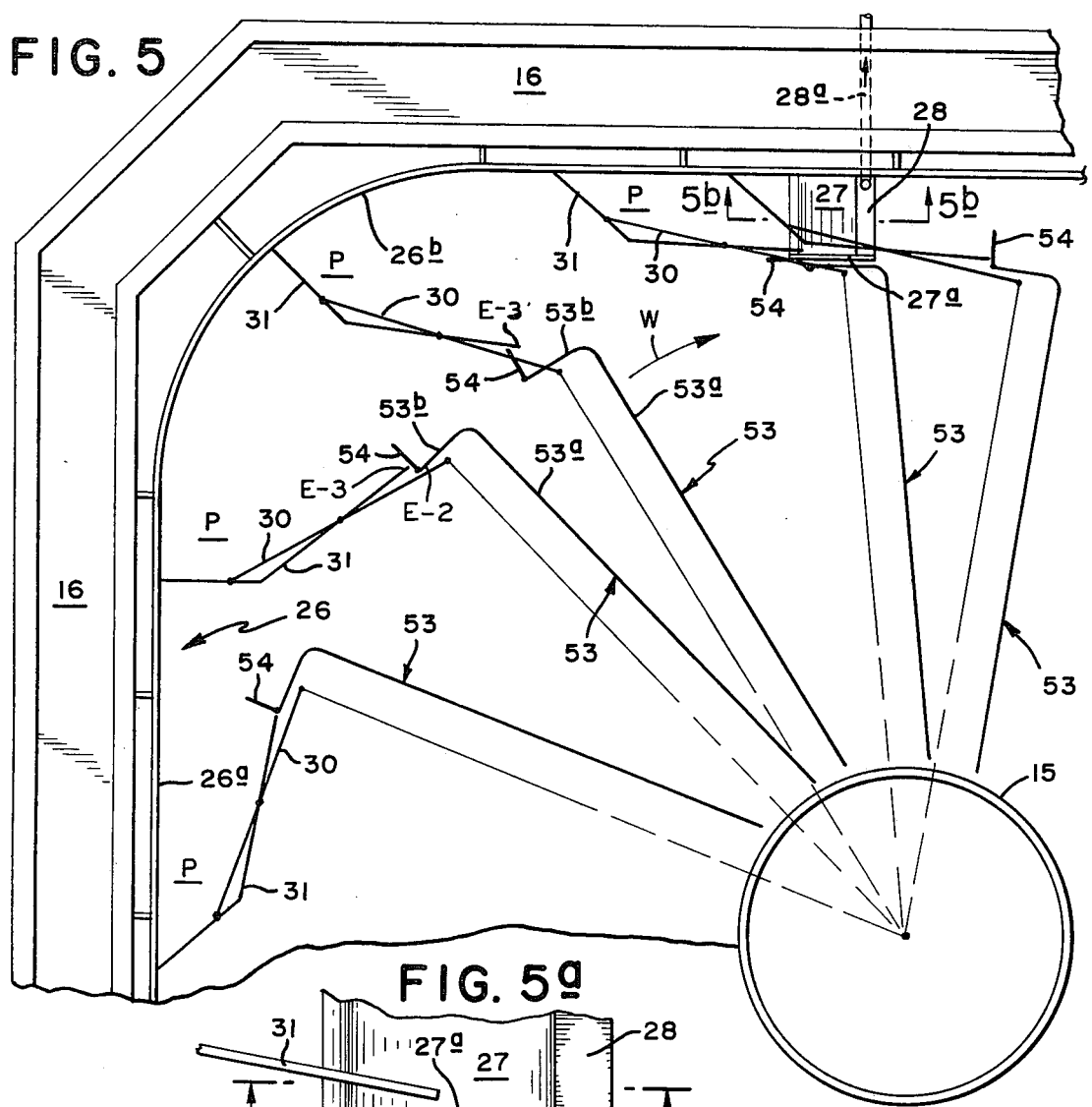
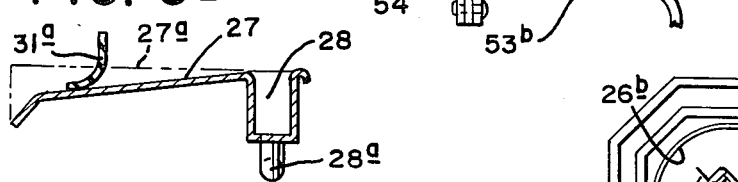
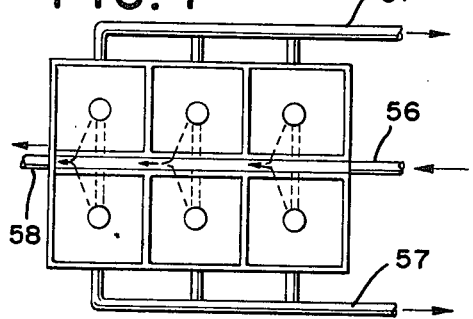
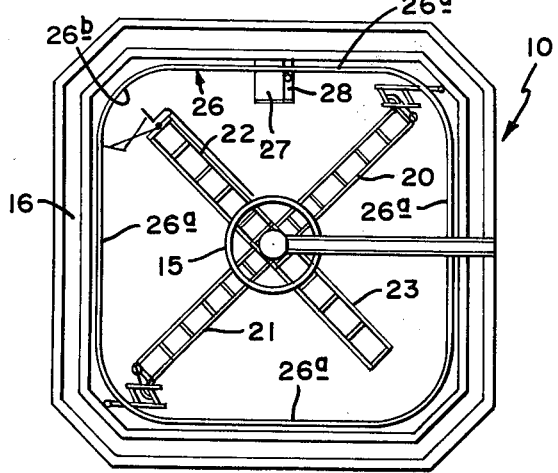

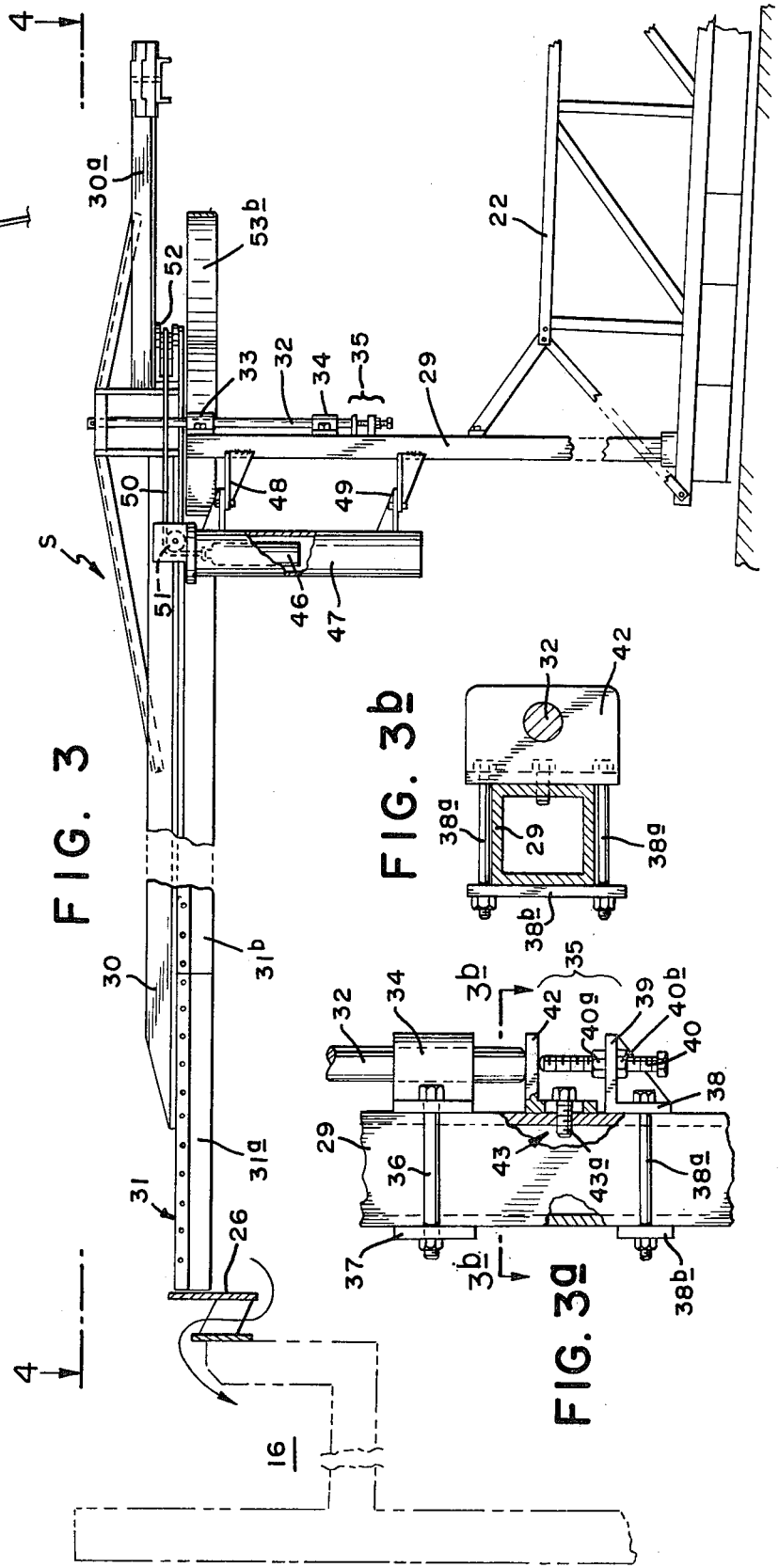

SKIMMER FOR SQUARE SETTLING TANKS

This invention relates to continuously operating sedimentation tanks wherein a rotary sludge raking structure has bladed rake arms which move the sludge continuously over the tank bottom to a sludge collecting zone for discharge, while supernatant or clarified liquid overflows into a peripheral receiving launder, as a result of a liquid solids feed suspension supplied into a feed well located in the central area of the tank.

For the purpose herein under consideration, such settling tanks are provided with scum skimming devices rotating together with the rake structure, so that they may collect and remove floating scum from the surface of the liquid body in the tank, a scum condition such as encountered for example in the operation of sewage settling tanks.

Such a skimming device or skimmer will move the scum along a usual scum intercepting scum baffle which extends peripheraly spaced inwardly from the overflow launder. The scum is moved along the scum baffle, and finally up along the slope of a ramp for delivery into a scum receiver box which is associated with the ramp. The box has a discharge connection leading to a point outside of the tank.

Moving the collected scum up along the ramp into the receiving or discharge box, and riding over and past the discharge box, the skimmer then continues for another round of scum collection and disposal, carried around by the raking structure.

More particularly, this invention is concerned with the problem of providing effective scum skimming devices for square settling tanks as differentiated from those of round configuration, the latter requiring more expensive cylindrical wall construction combined with less effective ground space utilization. Square tanks afford optimum space utilization insofar as they can be arranged compactly in double rows, and where mutually adjoining tanks may have a common wall between them.

Square tanks such as herein under consideration are equipped with a rotary rigid sludge raking structure which may be basically similar to those operating in the round type of tank. But in addition, the bladed rake arm of such a raking structure, may carry mounted on its outer end portion a socalled corner exploring device which during rotation will automatically move into and out of the corner areas of the tank bottom. In this way, sludge is moved out of those corner areas into the circular area covered by the arms of the basic rake structure, whereby the combined sludges will eventually reach a central sludge discharge zone.

This invention, however, is concerned with the problem of providing a scum skimming device for a square settling tank, wherein a corner exploring skimmer member at the top of the tank is to be kept in contact with the scum baffle during rotation of the supporting rake structure. The baffle follows the general square shape of the tank, and is suitably rounded at the corners. An object is to provide such a scum skimming device that is capable of effectively collecting and moving the scum material along the scum baffle and out of the rounded corners towards a scum receiving box, and of containing the material trapped while being moved up along the slope of a ramp and into the receiving box connected to the ramp.

To that end, the skimming device of this invention provides a skimmer arm structure mounted upon a post that rises from a rake arm of the rotating rake structure. This skimmer arm structure is swingable about a vertical axis and in a predetermined horizontal plane, while being urged into contact with the scum baffle, so that it will collect and move scum along the baffle to a scum receiving box.

In a preferred embodiment this swingable yieldable arm structure comprises a skimming edge portion or member of generally shallow concavely shaped configuration in a horizontal plane, thus forming between it and the adjoining scum baffle a scum collecting pocket of substantial depth. This skimmer portion or skimming member has along the length thereof a bottom edge portion of resiliently deflectable material such as rubber of the like. This edge portion may be in the form of a skimmer strip deflectable in the manner of a sqeegee while moving the collected scum up along the slope of the ramp and into the scum receiving box.

The skimmer member is furthermore constructed and arranged so that it will cooperate with the ramp in containing trapped scum for delivery into the scum receiving box, with the sqeegee strip being deflected sufficiently to allow the skimmer member to override the box.

In order to enhance the scum collecting effectiveness of the swingable skimmer member, a flow directing non-swingable skimmer blade may be added and arranged so as to move bodily along with the skimmer member. The cooperative relationship with the swingable skimmer member, is such that floating scum material is thereby guided by the blade into said scum collecting pocket incident to rotation of the supporting rake structure.

A practical and preferred embodiment features a swingable skimmer arm structure comprising an horizontal beam fixed to a downwardly extending vertical stem. The stem is mounted on the post that rises rigidly from the outer end portion of the raking arm. The stem is turnable in a pair of vertically spaced bearings connected to the post, and represents the vertical axis about which the skimmer arm structure is swingable. A vertically adjustable thrust bearing means engage the lower end of the stem.

The horizontal beam supports a scum collecting skimmer member fixed to the underside of the beam, and shaped and arranged as above indicated for the purposes of this invention. The beam may comprise a rearward extension providing a means of counterbalancing the opposite skimmer carrying end portion of the beam.

The skimmer member is furthermore constructed and arranged relative to the corner curvature of the scum baffle, so that the line represented by the radial distance between the point of contact with the scum baffle and the vertical axis, forms with a tangent on said curvature at the point of contact an enclosed angle sufficiently smaller than 90 degrees to insure maintaining said contact between the skimmer member and the scum baffle during the corner exploring phase.

Further specific features are directed to structural details of the skimmer arm structure and to the manner of its operation.

Still other features reside in the cooperating relationship between the rear end of the swingable scum collecting skimmer member and the associated supplemental non-swingable scum guiding blade.

Other features and advantages will hereinafter appear.

FIG. 1a is a complete plan view of the settling tank.

FIG. 3 is an enlarged elevational detail view of the skimmer device of the invention shown in the left hand portion of FIG. 2.

FIG. 3a is an enlarged detail side view of a vertically adjustable thrust bearing arrangement for supporting the skimmer arm structure, taken from FIG. 3.

FIG. 3b is a cross-sectional view taken on line 3b — 3b in FIG. 3a.

FIG. 4 is a plan view taken on line 4—4 in FIG. 3

FIG. 5 is a further enlarged fragmentary plan view of a corner portion of the square settling tank of FIG. 1, showing sequential phases in the operation of the skimming devices.

FIG. 5a is an enlarged detail view taken from FIG. 5, of a special phase of the skimming operation, at the point of delivery of the scum into the scum receiving box.

FIG. 5b is a sectional view on line 5b — 5b in FIG. 5a and FIG. 5.

FIG. 7 is a schematic plan view of a multiplicity of mutually adjoining square settling tanks.

Figure 1:
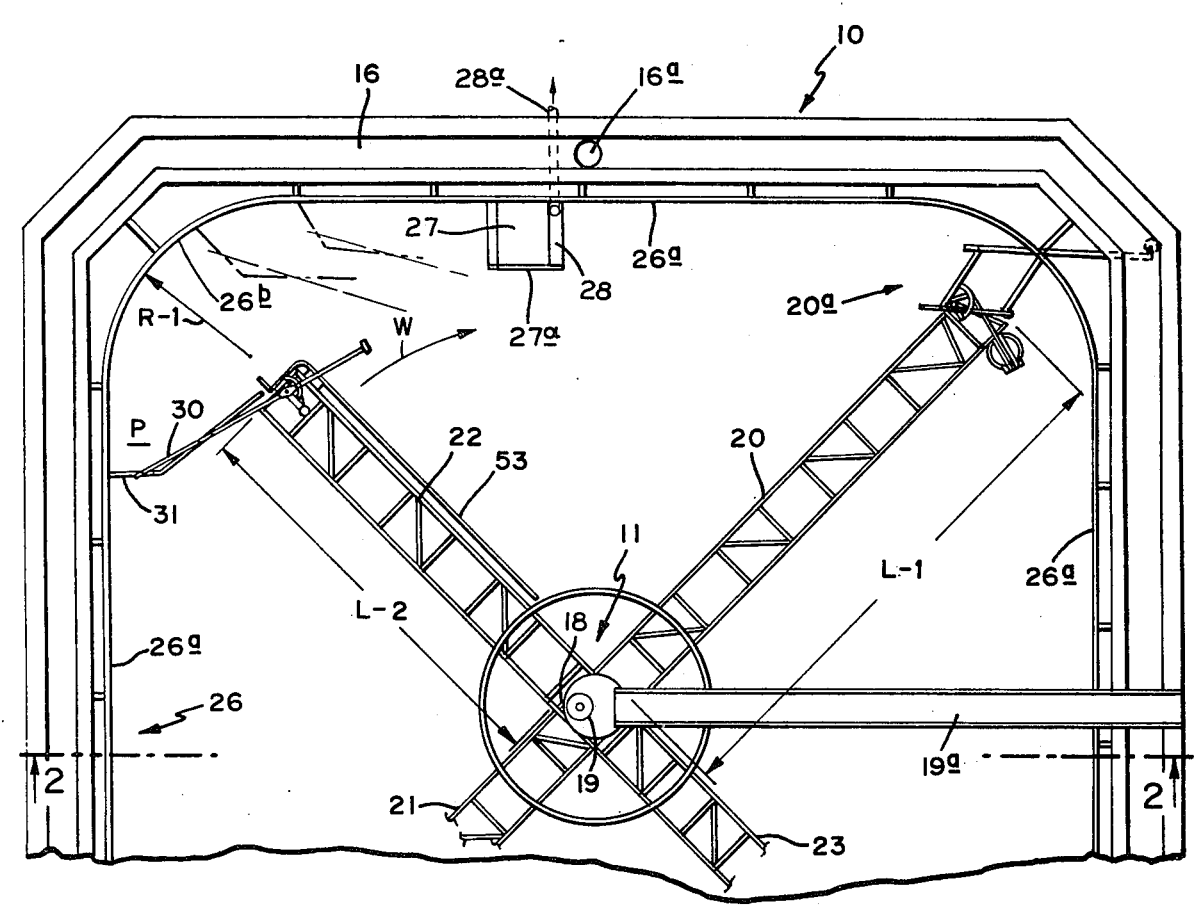
FIG. 1 is a semi diagrammatic fragmentary plan view of a square settling tank, showing the scum skimming devices of the invention, including a swingable skimmer member cooperating with the peripheral scum baffle, and with a non-swingable skimmer blade.

The corner exploring scum skimming device of this invention is embodied in a continuously operating tank of square configuration. This tank as shown by way of example in FIGS. 1, 1a, and 2, is of the socalled syphon type where the feed is introduced by upflow through a hollow center column which supports a rotary rake structure as well as the drive mechanism therefor.

Accordingly, in a tank 10 a rake structure 11 is supported for rotation on a hollow center column 12 to which the feed is supplied from a supply duct 13 underneath the tank. The upflowing feed passes through openings 14 in the column and through a surrounding feed well 15 into the body of liquid undergoing sedimentation in the tank. An overflow launder 16 extends along the periphery of the tank, defining the liquid level in the tank, and having a discharge connection 16a.

The hollow center column supports the rotary rake structure 11 which has sludge raking bladed rake arms extending from a vertical center cage portion 18 surrounding the column. This center cage portion supports the rake structure from a drive head 19 mounted atop the column or hollow center pier and served by an access bridge 19a, as is well known in the art.

Figure 2:
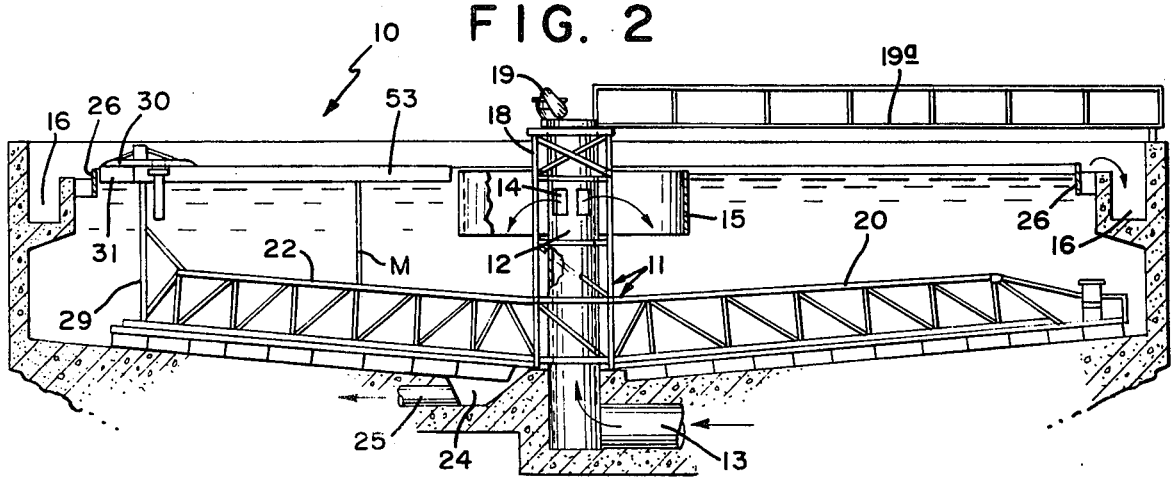
FIG. 2 is a vertical sectional view of the settling tank, taken on line 2—2 of FIG. 1.

The rake structure as herein shown by way of example has two pairs of rake arms, namely a first pair of long rake arms 20 and 21 of greater length L-1, and a pair of rake arms 22 and 23 of shorter length L-2 (see FIG. 1 and FIGS. 1a). At least one of the long rake arms in this embodiment such as arm 20 carries a bottom corner exploring device 20a of a construction known from Scott U.S. Pat. No. 2,261,487 which moves sludge out of the bottom corner area and into the sludge raking area of the supporting rake arm which then moves the combined sludges from both areas into a sump 24 at the foot of the column for discharge through a withdrawal connection 25.

At the top of the tank, a scum baffle 26 cooperates with the launder in arresting floating scum material, said scum baffle conforming to the generally square shape of the tank. Accordingly, the scum baffle has four straight sides portions 26a and rounded corner portions 26b also designated by a radius R-1.

At least one of the shorter arms such as arm 22 carries the corner exploring scum skimming devices of this invention. These skimmer devices form with the scum baffle 26 a pocket "P" whereby the scum is collected and moved along the scum baffle eventually to be trapped for delivery over a ramp 27 into a scum receiving box 28 discharging to a point outside the tank, as indicated by the connection 28a. The ramp has a side wall 27a.

These corner exploring skimming devices and the manner in which they cooperate with the scum baffle and with the scum receiving — and discharge box will now be described as follows:

The skimmer device "S" (see FIGS. 3 and 4) is carried by a post 29 that rises rigidly from the outer end of the short rake arm 22. In this device, an horizontal swingable carrier beam or arm 30 has fixed or bolted to the underside thereof a specially shaped skimmer member 31 of shallow concave or obtuse angular configuration taken in a horizontal plane. This skimming member has running from end to end thereof a bottom edge portion or strip 31a of resiliently deflectable material such as rubber or composition, the purpose and function of which will be furthermore set forth below.

The carrier beam 30 and the shaped skimmer member 31 together thus constitute a composite skimmer arm structure "K" (see FIG. 4) cooperating with the scum baffle and with the scum receiving box.

The horizontal carrier beam or arm 30 has a downwardly extending vertical stem 32 whereby it is mounted on the post 29, so as to swing about the vertical axis of the stem. Accordingly, the stem is held upon the post by suitable mounting means shown to comprise a pair of vertically spaced bearings 33 and 34 connected to the post. A vertical thrust bearing 35 connected to the post supportively engages the lower end of the stem 32, thereby supporting the weight of the composite skimmer arm structure "K" which preferably includes a rearward extension 30a providing a weighted counterbalance for the skimmer carrying arm.

Referring to detail FIGS. 3a and 3b, it is seen that the vertically spaced bearings 33 and 34 may be connected to the post as by means of a pair tie bolts 36 held by an anchor plate 37, to fit a preferred square cross-sectional profile of the post (FIG. 3b).

The thrust bearing 35, in this embodiment, comprises an angular bracket 38 connected to the post in substantially the same manner as the two guide bearings above, in that the vertical shank portion of the bracket is held by a pair of tie bolts 38a (see FIG. 3b) together with an anchor plate 38b.

The horizontal or platform portion 39 of the bracket, is penetrated by a vertical threaded bolt 40 rigidly secured thereto by a pair of locknuts 40a and 40b tightened against the top and bottom faces respectively of this horizontal bracket portion. This bolt 40, while absorbing the downward thrust or weight of the composite swingable skimmer arm structure, allows this swingable arm structure to be adjusted bodily up and down parallel to itself and relative to the overflow level, as well as relative to the scum receiving box, after loosening the two locking screws.

For practical reasons there is interposed between the stem 32 and the threaded bolt 40 an horizontal thrust plate 42 in the form of an auxiliary bracket which is vertically adjustable together with the threaded bolt 40, due to a slot-and-bolt connection 43 provided between this bracket and the post 29. The bolt 43a of this connection is loosened while making the adjustment allowing the bracket 14 to move together vertically with the bolt 40, and while engaged by the stem 32. After the up or down adjustment has thus been effected, the two lock nuts 40a and 40b are tightened and then the bolt 43a is tightened, to fix the thrust bearing parts in their adjusted position.

In more detail, and in the preferred form, the skimmer member 31 is of an obtuse angular configuration comprising an outer shorter shank 31a and an inner shank 31b, the enclosed angle in a practical example being in the order of about 135°. From the plan view in FIG. 4, it is seen that the beam 30 traverses the skimmer member 31, with bolt connections 44 and 45 fixing it to the respective shank portions of the skimmer member at the points of intersection. These bolt connections are for instance in the nature of bolt-and-slot connections such as to allow for varying the skimming position of the skimmer member 31 relative to the scum baffle 26, as well as relative to the beam 30. Angular adjustability of the skimmer member in one direction is indicated by the dotted line D-1, and in the opposite direction by the dotted line D-2. Such angular adjustment in the horizontal plane permits of correspondingly varying the enclosed angle A-1 between the outer end portion or shank 31a of the skimmer member relative to the associated scum baffle 26. Also, the skimmer member may be adjusted bodily along the line of the supporting beam 30, thereby changing the effective total length of the composite skimmer arm structure K.

It will be understood that such adjustability of the skimmer member 31 is also attainable by means other than the bolt-and-slot connection, for example, by the provision of a row of bolt holes in each shank of the skimmer member, and respective associated rows of bolt holes in the supporting beam.

The skimmer member 31 during its movement around the tank is kept in cooperative contact with the scum baffle 26. Such contact is maintainable by means of a device for urging the skimmer member so as to maintain said contact with the scum baffle. Such a device as herein exemplified in a preferred embodiment, comprises a cylindrical weight 46 surrounded by a container 47 supported by a pair of vertically spaced brackets 48 and 49 fixed to the post 29. The weight 46 connected to a flexible linear transmitting element or flexible wire rope 50, engages a pulley 51 mounted on top of the container 47, for rotation about an horizontal axis. From the pulley the rope element continues in an horizontal plane and onto a sheave sector 52 coplanar with that horizontal plane.

The sheave sector 52 is fixed to the rear end-or rearward extension 30a of the beam, which extension as stated above, also serves as counter balance for the skimmer member. The sheave sector also indicated by the radius R-2, is concentric with the vertical axis of the swingable skimmer arm. Since the outer end of the rope element 50 is fixed to the outer end E-1 of the sheave sector, the weight 46 will act continuously to maintain the skimmer member in contact with the scum baffle 26.

Figure 6:
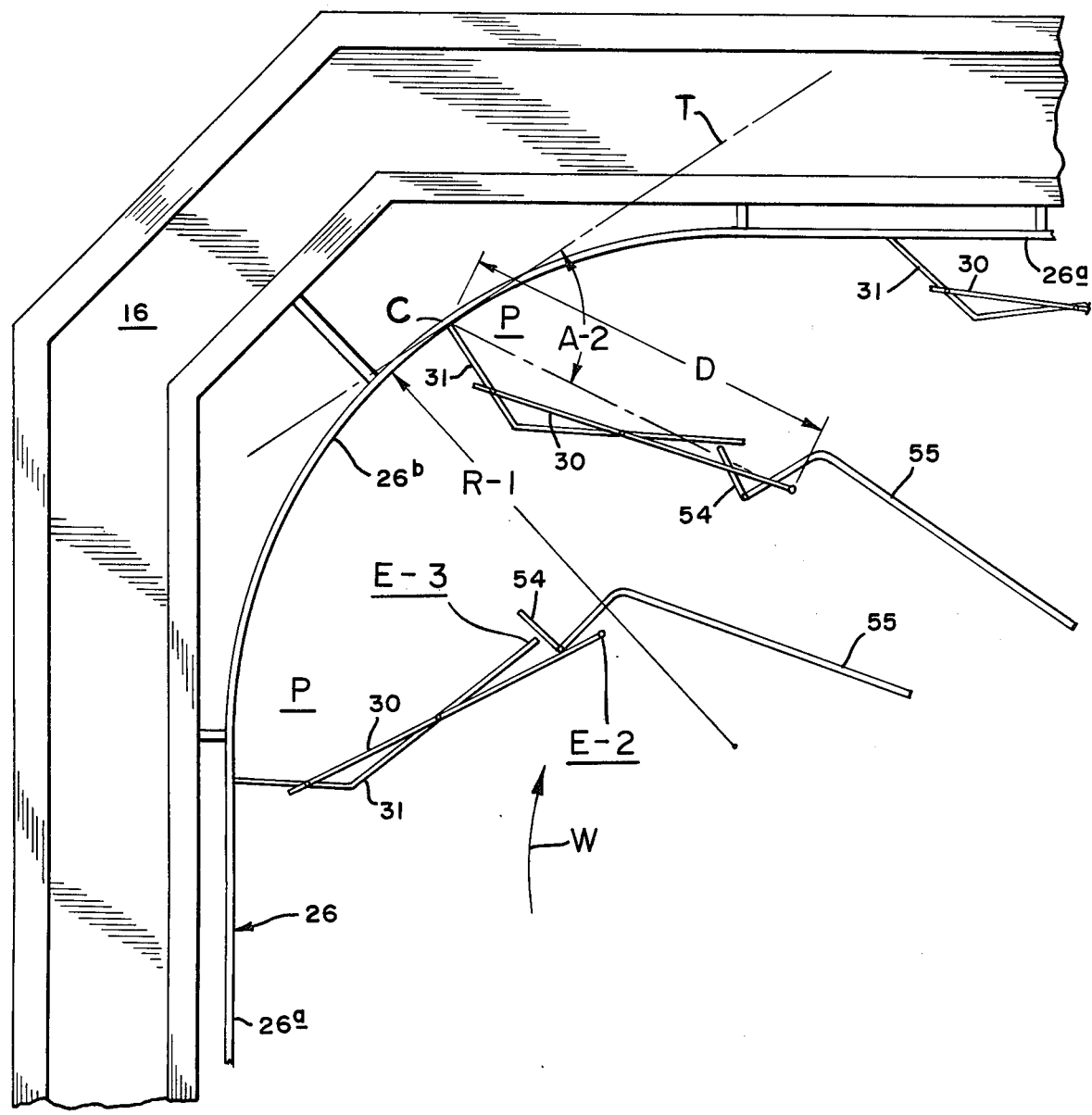
FIG. 6 is a further enlarged detail view taken from FIG. 5, of the corner section of the tank, bearing additional explanatory designation relative to the invention.

Furthermore, referring to FIGS. 5 and 6, in order to insure that the skimmer member 31 be maintained in proper operating contact with the curvature of the rounded portions of the scum baffle, the following additional qualifications should be met.

Accordingly, the skimmer member 31 should be so constructed and arranged that the line of the radial distance "D" between the point of contact "C" with the scum baffle and the vertical axis of rotation, should form with the tangent "T" on said curvature at the contact point, an enclosed angle "A-2" such as to insure maintaining said contact relationship of the parts. An enclosed angle of less than 90°, or else about 10° smaller than the 90°, would serve that purpose for average practical conditions.

In a preferred embodiment, the enclosed angle A-2 is variably adjustable to suit conditions, with the provision of the aforementioned adjusting means for varying the position of the skimmer member 31 relative to the supporting arm or beam.

In order to enhance the scum collecting effectiveness of the skimmer member 31, there is provided a cooperatively associated non-swingable auxiliary scum skimmer blade 53 (see FIGS. 1 and 5) moving together with the swingable skimmer member around the tank, The auxiliary skimmer blade 53 as seen in the embodiment of FIG. 5 has a long radially extending portion 53a, with a vertical member ("M") supporting it on the associated rake arm of the sludge raking structure. An inner short end portion 53b of blade member 53 curves around the post 29, and into cooperative relationship with the adjacent rear end of the skimmer member 31, all in a horizontal plane.

Attached to the inner end of the blade member 53 is a vertical flap 54 of resiliently deflectable material adapted to close or seal a gap between the forward end "E-2" of the non-swingable blade member 53 and the rearward end "E-3" of the swingable skimmer member 31 during operation. This cooperative sealing relationship of the parts in operation, and the function of the deflectable flap 54, are illustrated in FIG. 5 by the showing of the sequential angular positions of the skimmer member 31 during the corner exploring scum collecting phase. The showing of these positions makes this function selfexplanatory.

As the skimmer device leaves the corner curvature of the scum baffle (see FIG. 5) with a scum collection contained in the pocket "P", the skimmer member 31 or pocket "P" will close upon the ramp 27, thus trapping the collected scum, while being separated from the flap 54 which is being deflected by the side wall 27a of the ramp (see FIG. 5 and 5a).

Continued movement of the skimmer device in the direction of arrow "W", will in turn also cause deflection of the flexible skimmer edge portion 31a against the ramp (see FIG. 5b), such as to allow the skimmer 31 to deliver the collected scum while passing over the scum receiving box. Past the scum box, both the horizontal flexible edge portion 31a of the skimmer member 31 and the vertical sealing flap 54 resume their non-deflected shape adapted for another round of scum collection.

The long auxiliary skimmer blade 53 of FIG. 5, may be replaced by the shorter or stub shaped blade 55 fixed to the post, as in the combination shown in FIG. 6.

In the schematic FIG. 7, a plan view of a double row of square settling tanks of the kind herein under consideration, illustrates the space saving compactness of a battery of tanks, as well as the relative savings attainable in the tank wall construction. Underground feed supply for the tanks is indicated at 56, and overflow discharge at 57, while sludge delivery from the bottom of the tanks is indicated by the dotted line 58.

1. In a square type continuously operating settling tank having a central feed supply, a four-sided overflow launder extending along the periphery of the tank, defining the overflow level for supernatant liquid separated from sludge settled on the tank bottom, sludge outlet means in the tank bottom, and a rotary rake structure having rake arms effective to move sludge over the tank bottom to said outlet means, the combination which comprises a four-sided scum baffle having rounded corners, cooperating with the overflow launder in arresting floating scum, a post rising vertically from a rake arm of said raking structure, an horizontal skimmer arm structure turnably supported by said post for swinging movement in an horizontal plane, a scum engaging skimmer member carried by said arm structure unitary therewith and shaped to form with the scum baffle a scum collecting pocket, said skimmer member having a resiliently deflectable bottom edge portion, pressure means for urging said skimmer member into cooperative contact with said scum baffle, so as to form therewith said scum collecting pocket, a scum receiving box located at one side of said scum baffle, and a ramp connected to the inlet side of the box, said ramp and said skimmer member being constructed and arranged for cooperation with one another so that the scum collected in said pocket is trapped between said skimmer member and said ramp while being moved up the ramp and into said receiving box by said deflectable bottom edge portion of the skimmer member.

2. The settling tank according to claim 1, wherein said skimmer member is constructed and arranged relative to the corner curvature of the scum baffle, so that the line represented by the radial distance between the point of contact of the skimmer member with the scum baffle and said post, forms with a tangent on said curvature at the point of said contact an enclosed angle such as to insure unobstructed contact of said skimmer member along with scum baffle.

3. The settling tank according to claim 1, with the addition of a stem extending vertically downward from said skimmer arm structure parallel and adjacent to said post, means for maintaining said stem in said parallel position, vertical thrust bearing means connected to said post, for supportively engaging the lower end of said stem, and adjusting means cooperatively associated with said vertical thrust bearing means, and operable to axially adjust said stem, whereby said skimmer arm structure is adjustably movable parallel to itself.

4. The settling tank according to claim 1, with the addition of a scum engaging skimmer blade carried by said skimmer arm structure, and extending into cooperative relationship with the rear end portion of said skimmer member, such that floating scum material is guided by said skimmer blade into said collecting pocket during rotation of said raking structure.

5. The settling tank according to claim 1, wherein said skimmer member is constructed and arranged so that the outer end portion thereof will constitute with the scum baffle an enclosed angle not greater than 90°.

6. The settling tank according to claim 1, wherein said post is fixedly connected to said rake structure, with the addition of a stem extending downward from said skimmer arm structure fixed thereto, a pair of vertically spaced bearings for the stem, connected to said post, and a vertical thrust bearing connected to said post, and supportively engaging the lower end portion of said stem, and means for vertically adjusting said thrust bearing on said post.

7. The settling tank according to claim 2, wherein said enclosed angle is about 10° smaller than 90°.

8. The settling tank according to claim 1, wherein said skimmer member is of generally concave shape facing towards the scum baffle, with the addition of connecting means for adjustably fixing the skimmer member to said skimmer arm, operable so as to adjust the position of said skimmer member in a horizontal plane relative to said skimmer arm as well as relative to said scum baffle.

9. The settling tank according to claim 1, wherein said skimmer member is of generally concave shape facing towards the scum baffle, and having an outer shank portion engaging the scum baffle, and an inner shank portion, with the addition of means for fixing the skimmer member to the underside of said skimmer structure at the respective shank portions.

10. The settling tank according to claim 1, wherein said skimmer member is of generally concave shape facing towards the scum baffle, comprising an outer shank portion engaging the scum baffle, and an inner shank portion, with the addition of first means for connecting said outer shank portion to the outer end portion of said skimmer arm structure, and second means for connecting said inner shank portion to said skimmer arm structure at a point spaced inwardly from said first connecting means.

11. The settling tank according to claim 1, with the addition of a scum engaging skimmer blade carried by said skimmer arm structure, and extending into cooperative relationship with the rear end portion of said skimmer member, such that floating scum material is guided by said skimmer blade towards said collecting pocket during rotation of said raking structure, the outer end of said skimmer blade having attached thereto a vertical flexible flap of resiliently deflectable material, arranged to provide a sealing relationship with said inner end of the skimmer member, said flap furthermore adapted to be deflected by the respective side of said ramp and of said scum receiving box incident to said skimmer member overriding said ramp and said box.

12. The settling tank according to claim 1, wherein said skimmer arm structure comprises an outer end portion carrying said skimmer member, and an inner end portion extending in the opposite direction from the vertical axis of rotation of the skimmer member, and wherein said pressure means comprise a bracket arm extending radially from said post and in a direction such as to provide an anchoring point, and tension means efffective between said anchoring point and said inner end portion of said skimmer arm for maintaining said skimmer member in contact with said scum baffle.

13. The settling tank according to claim 1, wherein said post is fixedly connected to said rake structure, with the addition of a vertical stem extending downwardly from said skimmer member and parallel to said post, bearing means for mounting said stem in vertical position and turnable on said post, said bearing means comprising a pair of vertically spaced bearings for the stem, connected to said post, and vertical thrust bearing means connected to said post and supportively engaging the lower end of said stem, and means for vertically adjusting said thrust bearing on said post, with the addition of a non-swingable and scum engaging skimmer blade having an outer end cooperating with the inner end of said skimmer member, for guiding floating scum material into said pocket incident to the rotation of said raking structure, said outer end of the blade having attached thereto a vertical flap of resiliently deflectable material, arranged to provide a sealing relationship with said inner end of the skimmer member, said vertical flap furthermore adapted to be deflected by the respective side of said ramp and of said scum receiving box incident to said skimmer member overriding said ramp and said box.

* * * * *